(12) United States Patent
Kloss et al.

(10) Patent No.: US 10,989,137 B2
(45) Date of Patent: Apr. 27, 2021

(54) THERMALLY ENHANCED EXHAUST PORT LINER

(71) Applicant: Cartridge Limited, New York, NY (US)

(72) Inventors: Joachim Kloss, Dettenheim (DE); Andreas Steinbronn, Stuttgart (DE)

(73) Assignee: CARTRIDGE LIMITED, New York, NY (US)

( * ) Notice: Subject to any disclaimer, the term of this patent is extended or adjusted under 35 U.S.C. 154(b) by 0 days.

(21) Appl. No.: 16/667,254

(22) Filed: Oct. 29, 2019

(65) Prior Publication Data

US 2020/0132014 A1 Apr. 30, 2020

Related U.S. Application Data

(60) Provisional application No. 62/751,914, filed on Oct. 29, 2018.

(51) Int. Cl.
*F02F 1/42* (2006.01)
*B33Y 10/00* (2015.01)
(Continued)

(52) U.S. Cl.
CPC ............ *F02F 1/4271* (2013.01); *B22F 5/008* (2013.01); *B22F 10/20* (2021.01); *B33Y 10/00* (2014.12);
(Continued)

(58) Field of Classification Search
CPC .......... F02F 1/4271; F02F 1/30; F02F 11/002; F02F 2200/06; B33Y 10/00; B33Y 70/00; B33Y 80/00; B23F 3/1055; B22F 2301/15
(Continued)

(56) References Cited

U.S. PATENT DOCUMENTS 4,089,163 A 5/1978 Yamazaki et al.
4,123,902 A * 11/1978 Lida ..................... F01N 3/26
123/193.5
(Continued)

FOREIGN PATENT DOCUMENTS

CA 1298207 C 3/1992
CN 105142852 A 12/2015
(Continued)

OTHER PUBLICATIONS

International Search Report and Written Opinion of the International Search Authority for International Application No. PCT/US2019/058639, dated Mar. 18, 2020 (14 pages).

*Primary Examiner* — Lindsay M Low
*Assistant Examiner* — Yi-Kai Wang
(74) *Attorney, Agent, or Firm* — Goodwin Procter LLP

(57) ABSTRACT

An exhaust port liner, which may include a superalloy and may be manufactured by an additive manufacturing process, includes a monolithic structure including an outlet disposed an angle relative to an inlet, and a sidewall defining a cavity to provide enhanced thermal performance in reciprocating internal combustion engines. A cylinder head of an internal combustion engine may include a cylinder head frame, and the exhaust port liner may be disposed proximate the frame inner mounting surface, with an outer surface of the exhaust port liner conforming to an inner mounting surface of the cylinder head frame.

63 Claims, 9 Drawing Sheets

(51) Int. Cl.
  *B33Y 70/00* (2020.01)
  *B33Y 80/00* (2015.01)
  *B22F 5/00* (2006.01)
  *F02F 1/30* (2006.01)
  *F02F 11/00* (2006.01)
  *B22F 10/20* (2021.01)

(52) U.S. Cl.
  CPC .............. *B33Y 70/00* (2014.12); *B33Y 80/00* (2014.12); *F02F 1/30* (2013.01); *F02F 11/002* (2013.01); *B22F 2301/15* (2013.01); *F02F 2200/06* (2013.01)

(58) Field of Classification Search
  USPC ....................................................... 123/41.69
  See application file for complete search history.

(56) References Cited

U.S. PATENT DOCUMENTS

| | | | |
|---|---|---|---|
| 5,107,649 A | | 4/1992 | Benson et al. |
| 5,239,956 A | * | 8/1993 | Keelan ...................... B22C 1/00 123/193.5 |
| 5,260,116 A | * | 11/1993 | Hamanaka ............ C04B 35/478 123/270 |
| 5,414,993 A | | 5/1995 | Kon |
| 6,199,371 B1 | | 3/2001 | Brewer et al. |
| 6,390,051 B2 | | 5/2002 | Hilpert et al. |
| 6,866,478 B2 | | 3/2005 | Fabian et al. |
| 7,654,240 B2 | | 2/2010 | Jarrett et al. |
| 8,226,362 B2 | | 7/2012 | Schmitz et al. |
| 9,657,682 B2 | | 5/2017 | Graham et al. |
| 9,776,282 B2 | | 10/2017 | Subramanian et al. |
| 9,816,388 B1 | | 11/2017 | Kirtley et al. |
| 9,822,728 B2 | | 11/2017 | Hiratsuka et al. |
| 9,945,318 B2 | | 4/2018 | Park et al. |
| 2004/0137175 A1 | | 7/2004 | Dillon et al. |
| 2007/0275210 A1 | | 11/2007 | Heselhaus |
| 2012/0251777 A1 | | 10/2012 | Duval et al. |
| 2013/0149477 A1 | | 6/2013 | Minelli |
| 2013/0156555 A1 | * | 6/2013 | Budinger .............. C22C 19/056 415/182.1 |
| 2013/0220265 A1 | * | 8/2013 | Hironaka .............. F02F 1/4271 123/193.5 |
| 2014/0260282 A1 | | 9/2014 | Pinnick et al. |
| 2015/0027390 A1 | * | 1/2015 | Garrison ................. F02M 26/41 123/41.69 |
| 2015/0033559 A1 | | 2/2015 | Bruck et al. |
| 2015/0132601 A1 | | 5/2015 | Bruck et al. |
| 2015/0201500 A1 | | 7/2015 | Shinar et al. |
| 2015/0224607 A1 | | 8/2015 | Bruck et al. |
| 2015/0239046 A1 | | 8/2015 | McMahan et al. |
| 2016/0003156 A1 | | 1/2016 | Hanson |
| 2016/0023272 A1 | | 1/2016 | Mongillo, Jr. et al. |
| 2016/0025035 A1 | | 1/2016 | Kadoshima et al. |
| 2016/0194762 A1 | | 7/2016 | Schaedler et al. |
| 2016/0215646 A1 | | 7/2016 | Gonyou et al. |
| 2016/0230993 A1 | | 8/2016 | Dai et al. |
| 2016/0319767 A1 | | 11/2016 | Deschauer Rejowski et al. |
| 2016/0332229 A1 | | 11/2016 | Snyder et al. |
| 2017/0058685 A1 | | 3/2017 | Tucker |
| 2017/0081250 A1 | | 3/2017 | Kamel et al. |
| 2017/0089260 A1 | | 3/2017 | Bookbinder et al. |
| 2017/0101871 A1 | | 4/2017 | Tiedemann et al. |
| 2017/0114667 A1 | | 4/2017 | Sabo et al. |
| 2017/0254298 A1 | | 9/2017 | Beyer et al. |
| 2017/0274456 A1 | | 9/2017 | Walker et al. |
| 2017/0306766 A1 | | 10/2017 | Munzer |
| 2018/0149039 A1 | | 5/2018 | Loeffel et al. |
| 2018/0178327 A1 | | 6/2018 | Smith et al. |
| 2018/0187569 A1 | | 7/2018 | Ucok et al. |
| 2019/0080679 A1 | * | 3/2019 | Alstad .................. G10K 11/172 |
| 2019/0291346 A1 | * | 9/2019 | Rudolph .............. B29C 35/0805 |
| 2019/0329355 A1 | * | 10/2019 | Gradl ................. B23K 15/0093 |
| 2019/0376465 A1 | * | 12/2019 | Bilancia ............. B22D 19/0009 |

FOREIGN PATENT DOCUMENTS

| | | |
|---|---|---|
| CN | 106001573 A | 10/2016 |
| CN | 106191709 A | 12/2016 |
| DE | 3815408 A1 | 12/1988 |
| DE | 3915988 A1 | 12/1989 |
| DE | 102017112216 A1 | 10/2017 |
| DE | 102018106341 A1 | 5/2018 |
| EP | 1507072 A2 | 2/2005 |
| EP | 2025776 A1 | 2/2009 |
| EP | 2584150 A2 | 4/2013 |
| EP | 3010671 A1 | 4/2016 |
| EP | 3141321 A1 | 3/2017 |
| FR | 2941964 A1 | 8/2010 |
| GB | 1550737 A | 8/1979 |
| GB | 2452476 A | 3/2009 |
| JP | S5290720 A | 7/1977 |
| JP | S5877141 A | 5/1983 |
| JP | H10318486 A | 12/1998 |
| JP | 2008169720 A | 7/2008 |
| WO | WO-2014180870 A1 | 11/2014 |
| WO | WO-2015196149 A1 | 12/2015 |

* cited by examiner

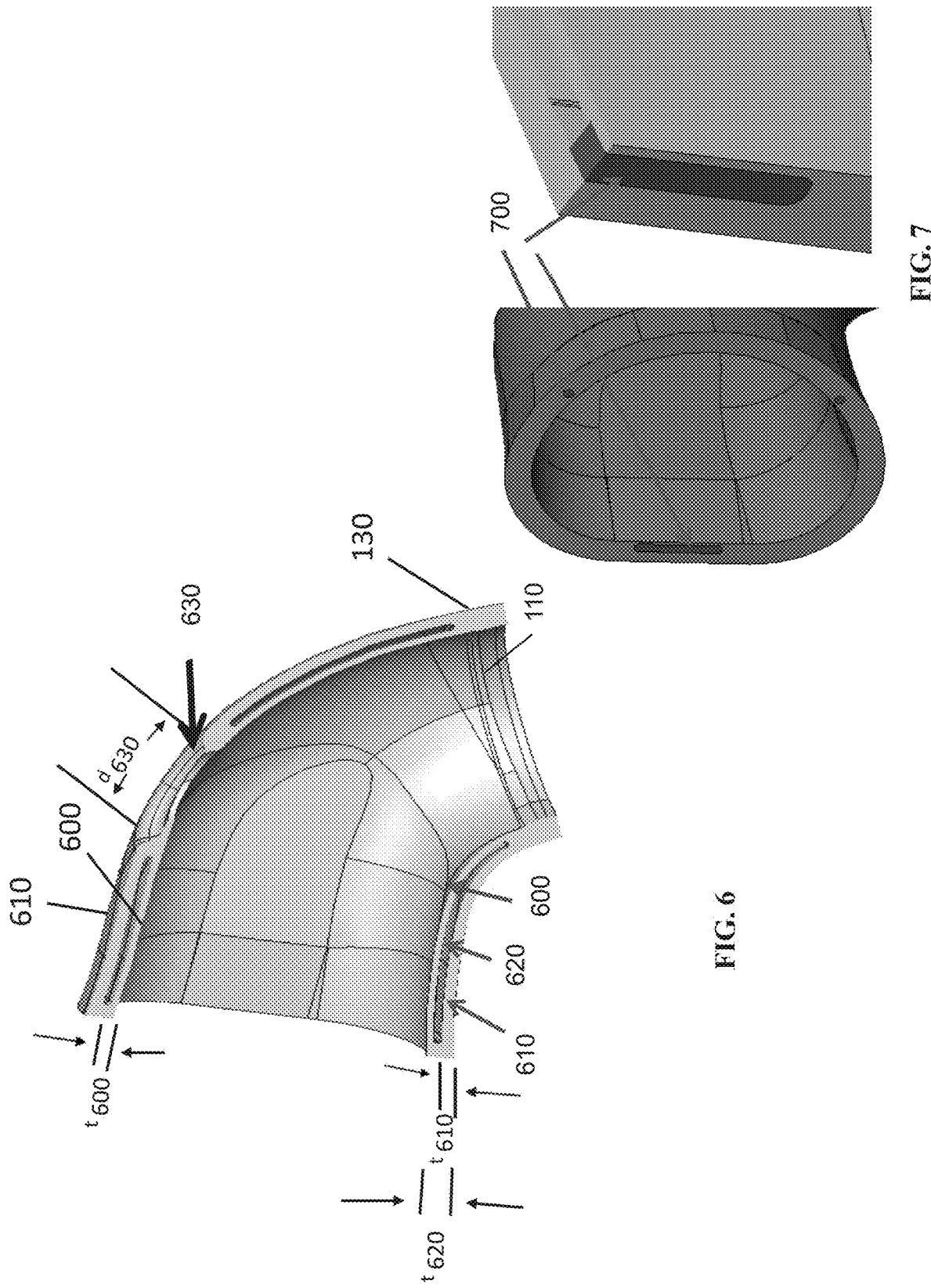

THERMALLY ENHANCED EXHAUST PORT LINER

RELATED APPLICATION

This application claims priority to and the benefit of, and incorporates herein by reference in its entirety, U.S. Provisional Patent Application No. 62/751,914, which was filed Oct. 29, 2018.

TECHNICAL FIELD

Embodiments of the invention relate to combustion engine technology and, more specifically, to improved thermal management in reciprocating internal combustion engines.

BACKGROUND

The cylinder head of modern reciprocating engines is subjected to extremes of loading, both in terms of high forces (imposed by gas pressures) and high thermal loads. Aluminum alloys are the favored material for many such engines, due to their combination of strength and light weight, plus casting ability.

A major problem within aluminum alloy cylinder heads is control of material temperature. Most suitable alloys have sharply decreasing resistance to yield above temperatures of approximately 260° C. The exhaust gases of such engines may reach 900° C. or more. These exhaust gases generally pass from the exhaust valve(s) through passages in the cylinder head (generally referred to as the exhaust ports) to the exhaust manifold or header pipes. Thus much effort is expended in designing the cylinder head, such that the material forming the ports is adequately cooled. The problem is particularly severe in air-cooled cylinder head designs.

In view of these problems, it is common practice to provide some form of thermal insulation or shield between the exhaust gases and the aluminum alloy which forms the exhaust port. Such so-called port liners are generally formed of ceramic material, which has very low thermal conductivity and hence prevents much of the heat flow from exhaust gas to the aluminum alloy. Such liners are generally placed into the mold prior to casting of the cylinder head. However, ceramic liners suffer from two major problems:

they are generally very brittle and hence prone to fracture both before casting, and during service; and
they have extremely low coefficients of thermal expansion, while aluminum alloys generally have relatively high coefficients of thermal expansion, resulting in high stresses being generated at the interface between the ceramic port liner and the parent material of the cylinder head, when the engine becomes hot.

SUMMARY

Embodiments of the present invention circumvent both of the above problems by providing a port liner manufactured from a high strength superalloy (typically nickel- or cobalt-based, e.g., Inconel®).

In an aspect, embodiments of the invention relate to an exhaust port liner for a cylinder head of an internal combustion engine. The exhaust port liner includes a monolithic structure including an inlet, an outlet disposed at an angle relative to the inlet, and a sidewall including a metal disposed between the inlet and the outlet defining an exhaust gas flow passage through the monolithic structure, the sidewall including an inner wall and an outer wall defining a cavity therebetween.

One or more of the following features may be included in any combination. The metal may include a superalloy. The superalloy may be or include a nickel-based superalloy and/or a cobalt-based superalloy.

The cavity may include air and/or an inert gas. The cavity may be sealed. The sealed cavity may further include a partial vacuum.

The metal may include a laser-sintered material.

The sidewall may define at least one aperture extending therethrough. The aperture may be aligned with an exhaust valve seat proximate the inlet when the exhaust port liner is installed in the cylinder head. The aperture may be sized and oriented to receive a valve guide.

The monolithic structure may include at least one filled opening forming a boundary of the cavity. The filled opening may be filled with the metal.

The angle may be in a range of 30° to 135°.

A pillar may be disposed in the cavity, spanning from the inner wall to the outer wall. A plurality of pillars may be in the cavity.

The port liner may include a second inlet adjacent to the inlet, with the inlet and the second inlet being in flow communication with the outlet. The sidewall may define a first aperture extending therethrough, sized and oriented to receive a valve guide. The sidewall may define a second aperture extending therethrough, sized and oriented to receive a second valve guide. The first aperture and the second aperture may be aligned with respective exhaust valve seats proximate the inlet and second inlet when the exhaust port liner is installed in the cylinder head.

In another aspect, embodiments of the invention relate to a method for fabricating an exhaust port liner. The method includes receiving by an additive manufacturing system control instructions for fabricating the exhaust port liner. The exhaust port liner includes a monolithic structure including an inlet, an outlet disposed at an angle relative to the inlet, and a sidewall including a metal disposed between the inlet and the outlet defining an exhaust gas flow passage through the monolithic structure. The sidewall includes an inner wall and an outer wall defining a cavity therebetween. The additive manufacturing system executes the control instructions to fabricate the exhaust port liner.

One or more of the following features may be included in any combination. The additive manufacturing system may employ at least in part vat polymerization, powder bed fusion, material extrusion, and/or direct energy deposition.

The metal may include a superalloy. The superalloy may be or include a nickel-based superalloy and/or a cobalt-based superalloy.

The cavity may be sealed by, e.g., filling an opening forming a boundary of the cavity. The opening may be filled with the metal. Sealing the cavity may include welding with an electron beam.

In still another aspect, embodiments of the invention relate to a cylinder head of an internal combustion engine including a cylinder head frame defining an inner mounting surface, and an exhaust port liner disposed proximate the frame's inner mounting surface. The exhaust port liner includes a monolithic structure that includes an inlet, an outlet disposed at an angle relative to the inlet, and a sidewall including a metal disposed between the inlet and the outlet defining an exhaust gas flow passage through the monolithic structure. The sidewall includes an inner wall and an outer wall defining a sealed cavity therebetween. An outer surface of the exhaust port liner conforms to the inner surface of the exhaust port.

One or more of the following features may be included in any combination. The metal may include a superalloy. The superalloy may be or include a nickel-based superalloy and/or a cobalt-based superalloy.

The sealed cavity may include at least one of air and/or an inert gas. The sealed cavity may include a partial vacuum.

The metal may include a laser-sintered material.

The sidewall may define at least one aperture extending therethrough. The aperture may be aligned with an exhaust valve seat of the cylinder head. The sidewall aperture may be sized and oriented to receive a valve guide.

The cylinder head frame may define a single mounting surface with a single exhaust port liner disposed proximate thereto and the sidewall may define a plurality of apertures, each sized and oriented to receive a valve guide.

At least one filled opening may form a boundary of the cavity. The filled opening may be filled with the metal.

The angle may be in a range of 30° to 135°.

A pillar may be disposed in the sealed cavity, spanning from the inner wall to the outer wall. A plurality of pillars may be in the cavity.

The cylinder head frame may include a second metal. The second metal may include or consist entirely of an aluminum alloy.

The exhaust port liner may be fabricated by additive manufacturing and the cylinder head frame may be fabricated by casting a second metal around the exhaust port liner. Alternatively, both the exhaust port liner and the cylinder head frame may be formed by additive manufacturing.

The cylinder head frame may define a plurality of inner mounting surfaces.

A plurality of the exhaust port liners may be included, with one of the plurality of exhaust port liners being disposed proximate each of the inner mounting surfaces.

The cylinder head frame may define eight inner mounting surfaces and the cylinder head may include eight exhaust port liners.

The cylinder head frame may include external cooling fins adapted for air cooling the cylinder head.

The cylinder head may have an absence of internal water coolant passages.

In still another aspect, embodiments of the invention relate to a method for fabricating a cylinder head of an internal combustion engine. The method includes fabricating an exhaust port liner by receiving by an additive manufacturing system control instructions for fabricating the exhaust port liner that includes a monolithic structure. The monolithic structure includes an inlet, an outlet disposed at an angle relative to the inlet, and a sidewall including a metal disposed between the inlet and the outlet defining an exhaust gas flow passage through the monolithic structure, the sidewall including an inner wall and an outer wall defining a cavity therebetween. The additive manufacturing system executes the control instructions to fabricate the exhaust port liner. A cylinder head frame is fabricated around the exhaust port liner to fabricate the cylinder head.

One or more of the following features may be included in any combination. The additive manufacturing system may employ at least in part vat polymerization, powder bed fusion, material extrusion, and/or direct energy deposition.

The metal may include a superalloy. The superalloy may be or include a nickel-based superalloy and/or a cobalt-based superalloy.

Fabricating the cylinder head frame may include casting molten metal. The molten metal may include or consist entirely of an aluminum alloy.

Fabricating the cylinder head frame may include a second additive manufacturing system receiving and executing control instructions to fabricate the cylinder head frame. The second additive manufacturing system may employ at least in part a vat polymerization, powder bed fusion, material extrusion, and/or direct energy deposition. The additive manufacturing system and the second additive manufacturing system may be a single additive manufacturing system.

The cavity may be sealed prior to the fabrication of the cylinder head frame. Sealing the cavity may include filling an opening forming a boundary of the cavity. The opening may be filled with the metal.

Sealing the cavity may include welding with an electron beam.

BRIEF DESCRIPTION OF DRAWINGS

The foregoing features and advantages of embodiments of the invention will become more apparent from a reading of the following description in connection with the accompanying drawings, in which:

FIG. 6 is a cross-sectional view of the exhaust port liner of FIG. 1;

FIG. 7 is a schematic view including a partial enlarged view of filled openings formed in the exhaust port liner of FIG. 1;

DETAILED DESCRIPTION

As used herein, "cylinder head frame" denotes a cylinder head component conventionally called a cylinder head casting; in this disclosure, this component may be formed by casting or by additive manufacturing.

An important feature of the described port liner is an integral inner sidewall cavity, which may be sealed and contain either a low-conductivity gas (e.g., air) or be at a partial vacuum. This cavity provides the thermal insulation between the exhaust gases and the parent material of the cylinder head.

The superalloy liner described herein may be smoother than ceramic liners along exhaust gas flowpath surfaces, providing better exhaust gas flow. The superalloy liners can be manufactured by 3D printing, for example using a selective laser sintering (SLS) process. The liners can be printed with holes at either end, such that excess loose alloy powder can be removed from the sidewall cavity. Once the powder is out of the cavity, the holes can be sealed, for example using an electron beam (EB) welding technique under partial vacuum.

The fabrication of the cylinder head frame around the superalloy liners by (for example) casting-in-place or additive manufacturing enables the outer surfaces of the superalloy liners to be in direct contact with the cylinder head aluminum. Another advantage of the 3D printed liners over ceramic liners is that structural features of different configurations may be readily incorporated into the external superalloy wall, for example to improve precise location and retention of the liners within the cylinder head during the fabrication of the cylinder head frame.

Figure 1:
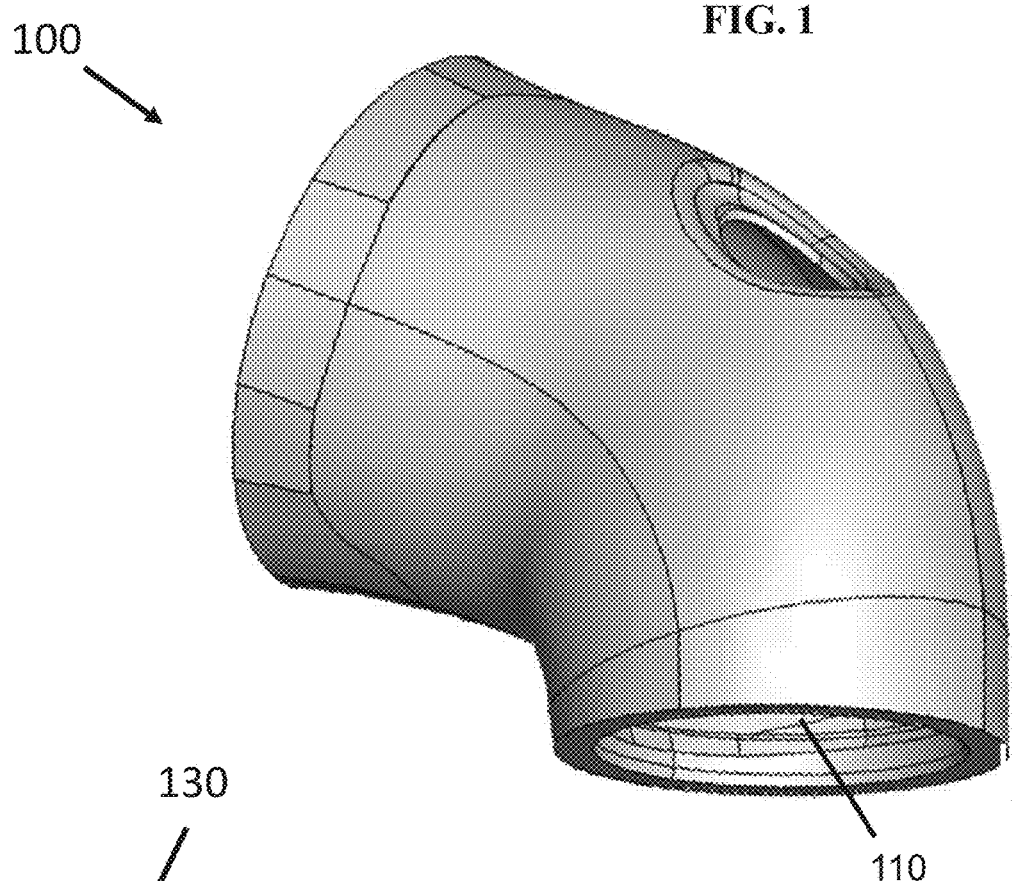
FIG. 1 is a perspective external side view of an exhaust port liner in accordance with an embodiment of the invention.
Figure 2:
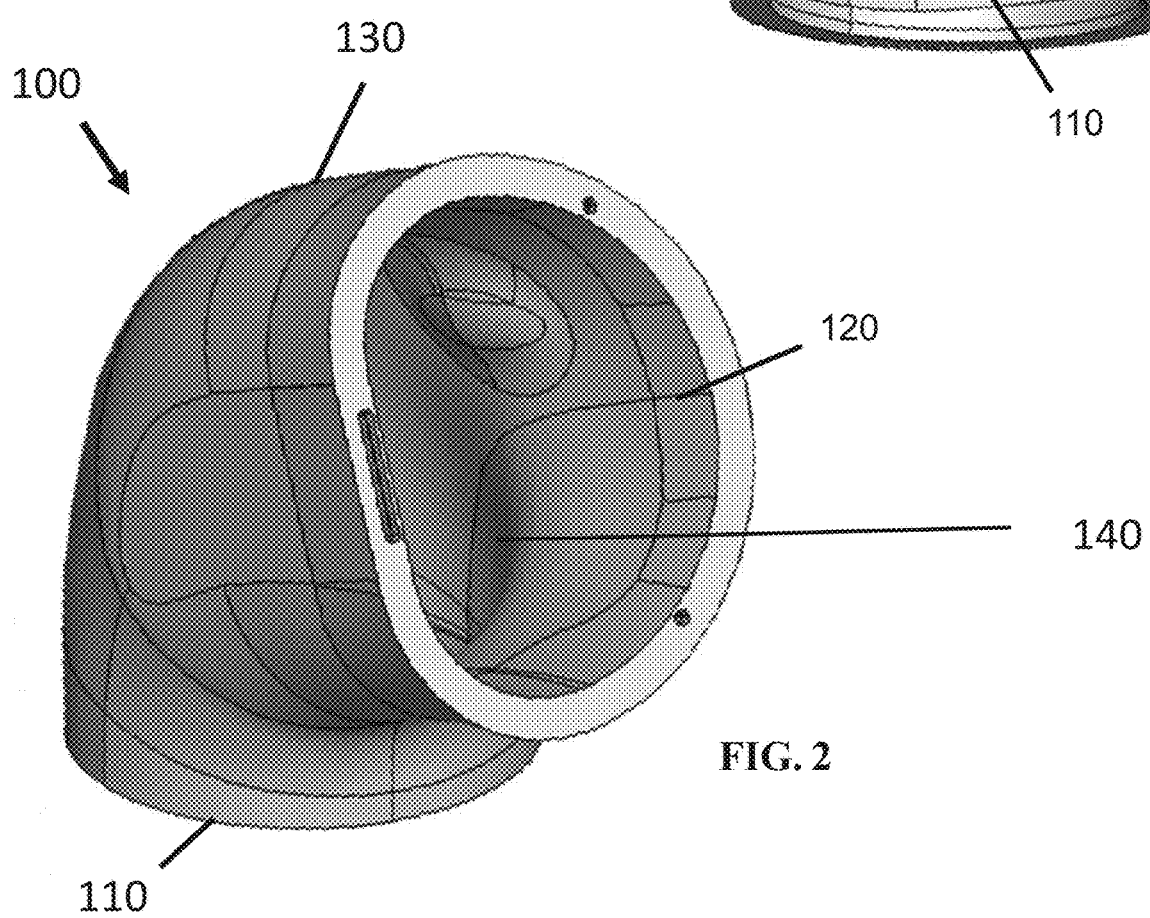
FIG. 2 is a perspective outlet end view of the exhaust port liner of FIG. 1, illustrating an internal portion of the exhaust port liner.
Figure 3:
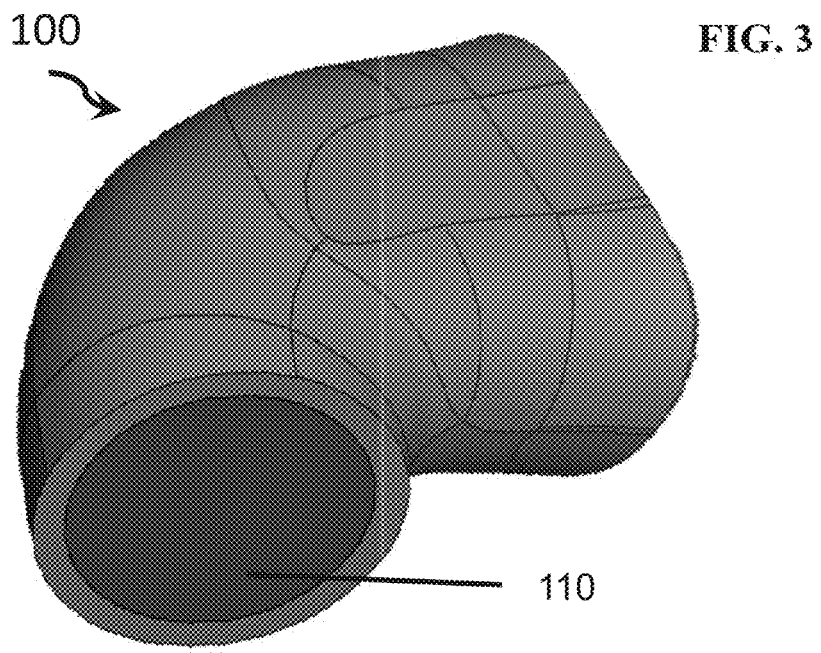
FIGS. 3 and 4 are schematic views illustrating the inlet and outlet, respectively, of the exhaust port liner of FIG. 1.
Figure 4:
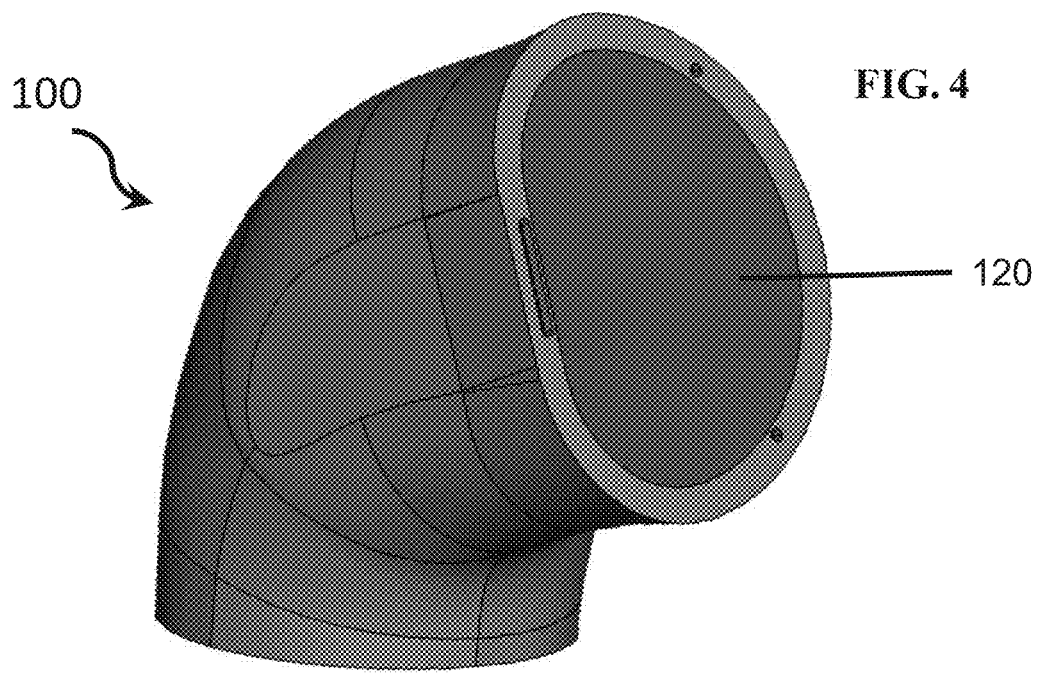
Figure 5:
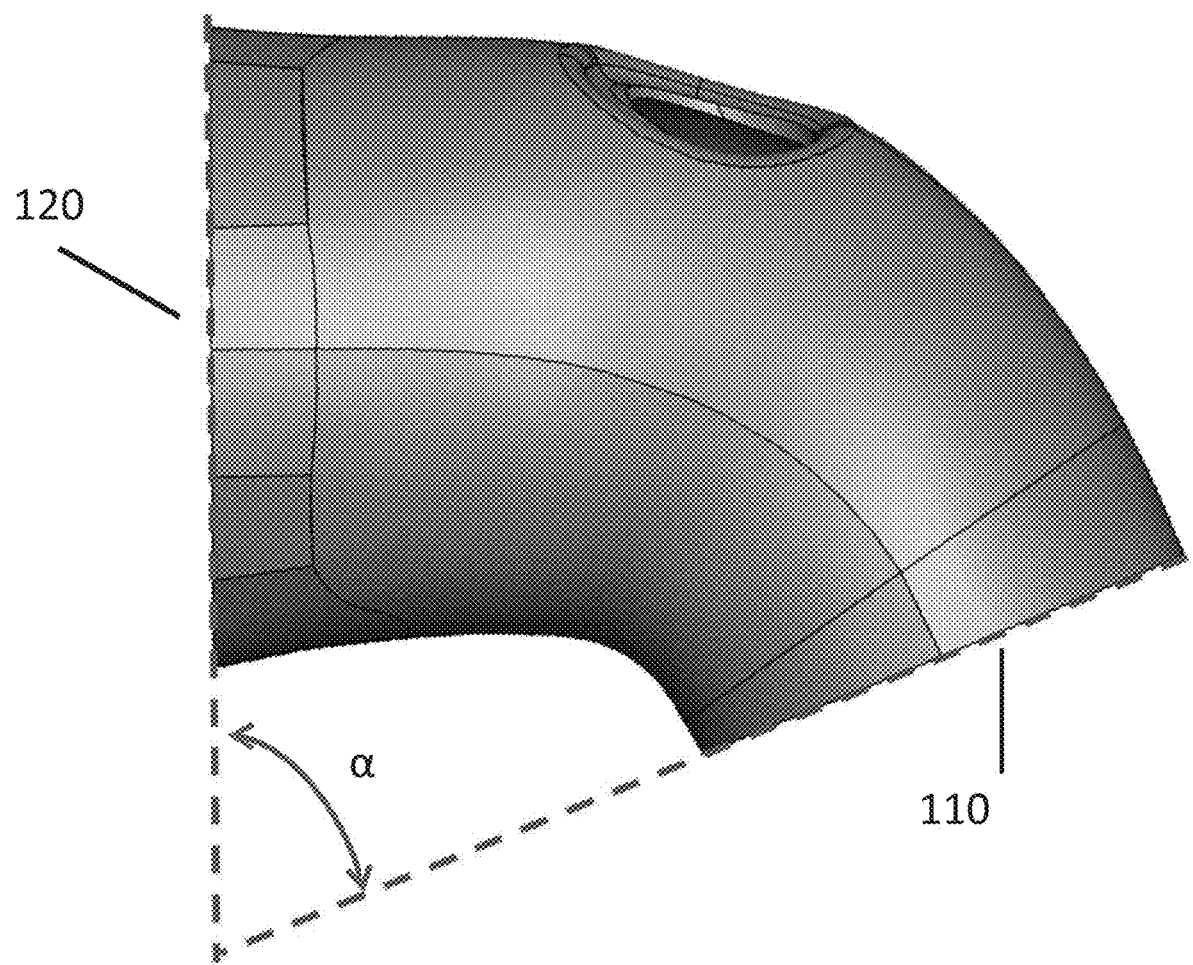
FIG. 5 is a schematic side view illustrating an angle between the inlet and outlet of the exhaust port liner of FIG. 1.

Referring to FIGS. 1 and 2, in accordance with an embodiment of the invention, an exhaust port liner 100 for a cylinder head of an internal combustion engine includes a monolithic structure that may be generally tubular with a cylindrical cross-section. The liner has an inlet 110 and an outlet 120, with the outlet being disposed at an angle α relative to the inlet. The angle α may be selected according to various requirements of good gas flow and general engine packaging. For example, in some embodiments, the angle may be selected from a range of 30° to 135°, e.g., 45° to 90°, for example 75°. The inlet 110 and outlet 120 are also illustrated in FIGS. 3 and 4 respectively, and the angle α between the inlet and outlet is illustrated in FIG. 5.

Referring again to FIGS. 1 and 2, the monolithic structure also includes a sidewall 130 disposed between the inlet and outlet, defining an exhaust flow passage through the monolithic structure. In some embodiments, the sidewall is formed of or consists essentially of a metal, such as a superalloy. Suitable superalloys include nickel-based superalloys (e.g., Inconel®) and cobalt-based superalloys. Superalloys have a number of advantages in comparison to ceramics used for making exhaust port liners. For example, superalloys are tougher, more durable materials than ceramics and hence avoid the brittleness of ceramics that are prone to failure in service. Superalloys have a thermal expansion coefficient better matched to aluminum materials used for the engine main cylinder head frame during casting processes than standard ceramic port liners. Accordingly, there is less thermally induced stress at the aluminum/superalloy interface than there is with an aluminum/ceramic interface. In some embodiments, the density of the superalloy may be 3 g/cm$^3$ to 13 g/cm$^3$, e.g., 8.2 g/cm$^3$. The surface finish may have a roughness average Ra of 1 µm to 7 µm, e.g., 4 µm.

Moreover, superalloys are not subject to degradation or chemical attack by the exhaust gases. For example, superalloys are used for certain high performance exhaust system components, such as some Formula One (F1) car exhaust manifolds.

Superalloys have not been previously used for port liners due to the difficulty of manufacturing a suitable part, with inclusion of an internal cavity, in such materials. However, such complex structural features may be fabricated from superalloys using additive manufacturing technology. For example, the metal may be a laser-sintered material.

Referring also to FIG. 6, the sidewall 130 includes an inner wall 600 and an outer wall 610, with a cavity defined between the inner and outer walls. The cavity may include a low thermal conductivity gas, such as air and/or an inert gas, e.g., argon. In some embodiments, the cavity may be sealed. Additionally, the sealed cavity may form a partial vacuum, i.e., less than 14.7 psi (for example 2-14.6 psi), e.g., 5 psi. This cavity provides thermal insulation between the hot exhaust gases and the parent cylinder head material in which the exhaust port liner is disposed. The formation of such a monolithic structure including a cavity is also facilitated by additive manufacturing processes.

A thickness two, thio of each of the inner wall 600 and outer wall 610 is selected such that adequate strength is achieved to resist undue deflections in the presence of high exhaust gas pressure loads. Accordingly, for a superalloy material, a preferred thickness of each of the inner and outer walls is selected from a range of 0.5 mm to 4 mm, e.g., 0.5 mm to 2.5 mm. A preferred distance between the inner surfaces of the inner and outer walls, i.e., a cavity 620 height $h_{620}$, is, e.g., 1 mm to 10 mm, such as 1 mm to 5 mm. For example, in an embodiment, a cavity height may be 1.5 mm and a thickness of each of the inner and outer walls may be 1 mm. The cavity height is selected such that an acceptable trade-off is achieved between the conflicting requirements of packaging, insulation, and manufacturing.

The sidewall may include at least one aperture 630 extending therethrough. The aperture may be sized and oriented to receive a valve guide and is aligned with an exhaust valve seat. For example, the aperture may have a diameter $D_{630}$ selected from a range of 7 to 15 mm, e.g., 8 mm.

Referring to FIG. 7, the monolithic structure may also include at least one filled opening 700 that forms a boundary of the cavity 620, e.g., filled with the same metal as used to form the inner and outer walls. This opening may be formed during the additive manufacturing of the monolithic structure and may be used to remove unprocessed building material from the cavity, e.g., unbound powder used during additive manufacturing of the monolithic structure. The opening may be disposed in the inner or outer wall, or an end portion of the monolithic structure, such that the opening is disposed at a boundary of the cavity. The opening may be filled after the unprocessed building material is removed, e.g., filled by electron beam welding in the case of a liner cavity held at a partial vacuum. Multiple openings of various shapes and sizes may be provided and later filled.

In some embodiments, the opening 700 may be left open. During a subsequent casting or additive manufacturing process, the unfilled opening is disposed flush with a mold wall such that the casting or additive manufacturing material does not enter the cavity. This procedure allows the cavity to be open in the final product. Air is a reasonably good insulator, so leaving the cavity open to external air still has insulation benefits, and also is cheaper to make, as one does not need to fill the opening. An opening also helps mitigate any stresses which may occur due to vacuum in the cavity.

Figure 8:
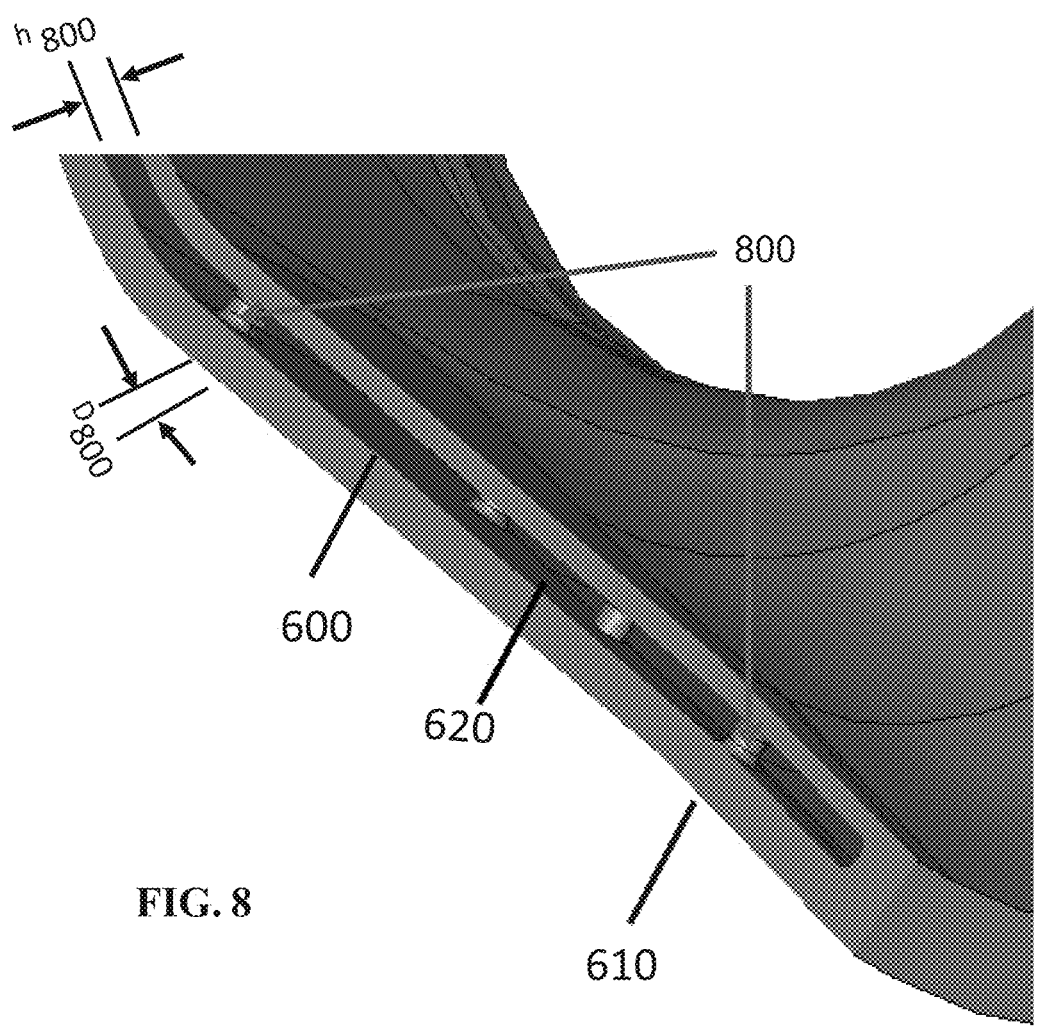
FIG. 8 is an enlarged cross-sectional view of a portion of the exhaust port liner of FIG. 1, illustrating pillars disposed within the sidewall cavity.

Referring to FIG. 8, one or more pillars 800 or bridging structures may be disposed in the cavity, spanning from the inner wall to the outer wall. The pillars are sized and arranged to stabilize the monolithic structure, i.e., to maintain a uniform distance between the inner and outer walls during engine operation and resultant exhaust gas pressure loading. For example, each of the pillars may have a diameter $D_{800}$ selected from a range of 0.5 mm to 4 mm, e.g., 0.5 mm to 2.5 mm, and a height $h_{800}$ of 1 mm to 5 mm (i.e., the same height as the height $h_{620}$ of the cavity 620).

Figure 9:
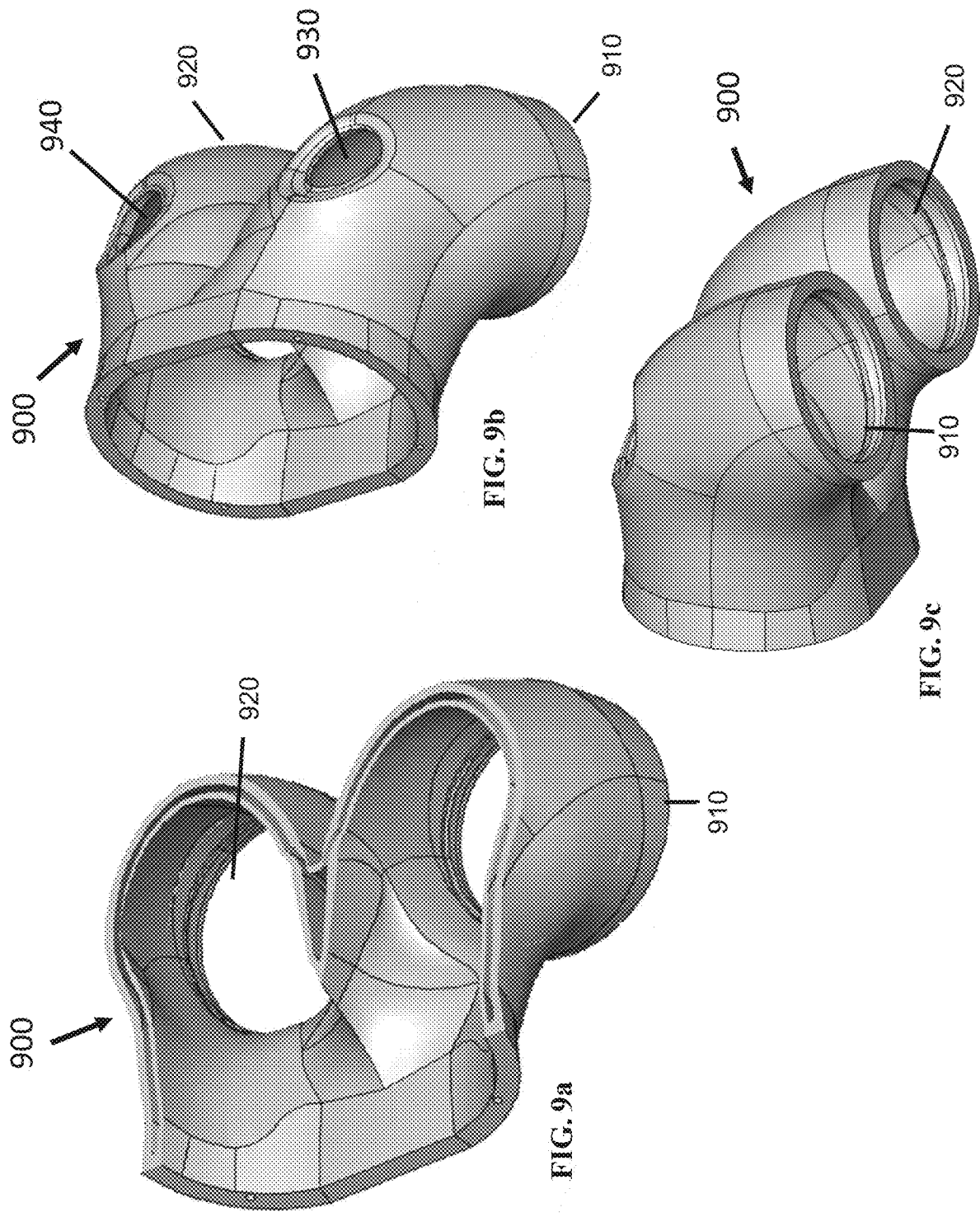
FIGS. 9a-9c are schematic cross-sectional, perspective top, and perspective bottom, respectively, views of an exhaust port liner adapted for use with two exhaust valves, in accordance with an embodiment of the invention.

Referring to FIGS. 9a-9c, in some embodiments, a single exhaust port liner 900 may cover more than one exhaust valve, i.e., a single liner may cover both exhaust valves of a single cylinder. Accordingly, the exhaust port liner may have a first and a second inlet 910, 920, such that the initial flow paths from the inlets are either symmetrically, or asymmetrically, disposed. The sidewall may define a first aperture 930 extending therethrough and aligned with the first exhaust valve seat, the first aperture being sized and oriented to receive a valve guide, and the sidewall may also define a second aperture 940 extending therethrough and aligned with the second exhaust valve seat, the second aperture being sized and oriented to receive a second valve guide.

Any of the exhaust port liners discussed above may be fabricated by additive manufacturing by a method suitable for fabricating metal articles, e.g., by vat polymerization, powder bed fusion, material extrusion, and/or direct energy deposition. A suitable additive manufacturing system is a selective laser sintering (SLS) system. For manufacturing Inconel® exhaust port liners, the additive manufacturing system needs to be capable of fabricating articles from a superalloy, such as a nickel-based superalloy or a cobalt-based superalloy.

The additive manufacturing system may receive control instructions for fabricating an exhaust port liner in accordance with an embodiment of the invention, i.e., including an article having monolithic structure with an inlet, an outlet disposed at an angle relative to the inlet, and a sidewall including a metal (e.g., a superalloy) disposed between the inlet and the outlet defining an exhaust gas flow passage through the monolithic structure, the sidewall having an inner wall and an outer wall defining a cavity therebetween. The additive manufacturing system may execute the control instructions to fabricate the exhaust port liner.

The exhaust port liner, as formed by the additive manufacturing process, may initially have an unsealed cavity, i.e., an aperture may be defined in the inner wall, end walls, and/or outer wall to facilitate removal of excess material from the cavity. For example, if the exhaust port liner is fabricated by powder bed fusion, unbound powder may be removed from the cavity through one or more apertures by forcing compressed air through the port liner to blow out the unbound powder, vacuuming out the unbound powder, and/or vibrating or shaking out the unbound powder. Subsequently, the cavity may be filled with air or an inert gas, such as argon to thermally insulate from ambient, during use, exhaust gas traveling through the liner to prevent heat loss from the hot exhaust gas.

After fabrication of the exhaust port liner, the cavity may be sealed. For example, after excess material is removed from the cavity through one or more apertures and the cavity filled with the desired gas or set at a partial vacuum, the cavity may be sealed by filling the aperture. For example, the aperture may be filled with the same metal as the metal used to form the inner and outer walls by, e.g., electron beam welding. The filled aperture thus forms part of the boundary of the cavity.

In some embodiments, an at least partial vacuum may be formed in the cavity before it is sealed, e.g., during electron beam welding.

Figure 10:
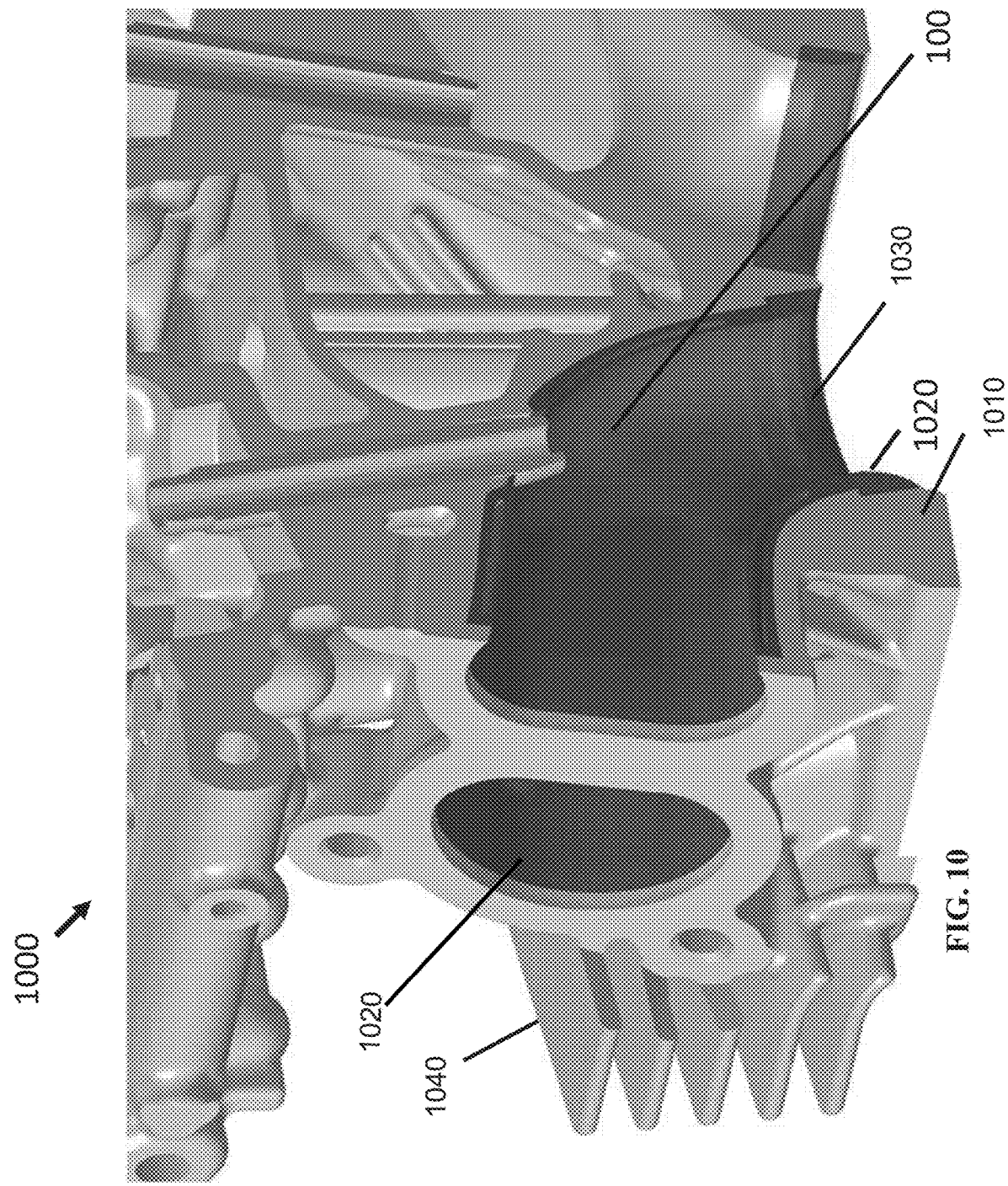
FIGS. 10 and 11 are perspective partial sectional views of exhaust port liners disposed in a cylinder head frame, in accordance with an embodiment of the invention.
Figure 11:
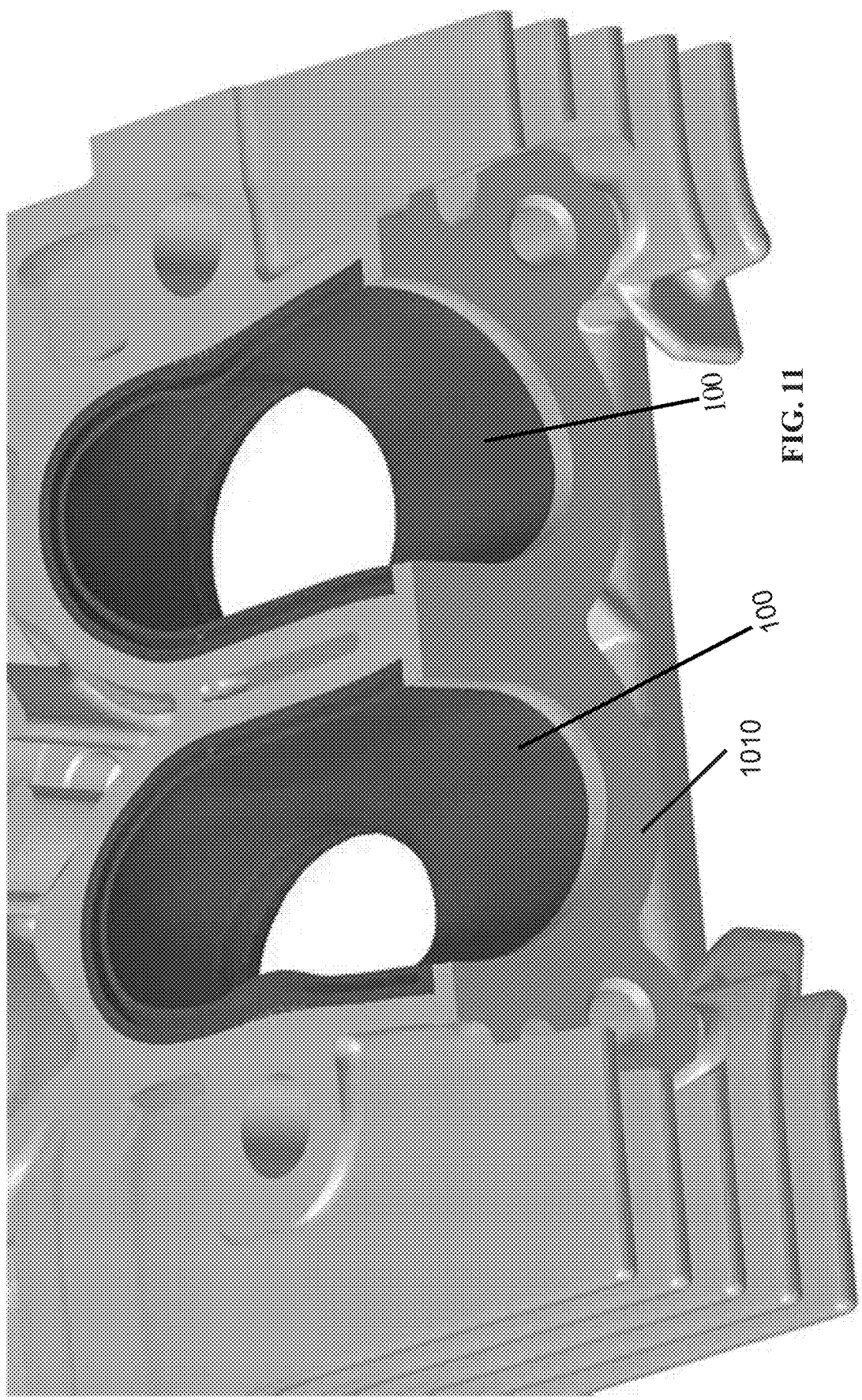

Referring to FIGS. 10-11, in an embodiment of the invention, a cylinder head 1000 of an internal combustion engine includes a cylinder head frame 1010 that defines a plurality of inner mounting surfaces 1020. Corresponding exhaust liners 100, as described above, are disposed proximate the inner mounting surfaces of the frame, with each outer surface of each exhaust port liner conforming to the corresponding inner mounting surface.

The cylinder head frame may define a plurality of exhaust ports, each with a single exhaust port liner disposed therein, with the sidewall defining apertures sized and oriented to receive a valve guide. Each aperture may be aligned with an exhaust valve seat 1030 of the cylinder head.

The cylinder head frame may be made from a second metal, such as an aluminum alloy.

The exhaust port liners may be formed by additive manufacturing and the cylinder head frame may be formed by casting a second metal around the exhaust port liners. Alternatively, the cylinder head frame may be fabricated by a second additive manufacturing system that receives and executes control instructions to fabricate the cylinder head frame. The second additive manufacturing system may employ at least in part vat polymerization, powder bed fusion, material extrusion, and/or direct energy deposition. In some embodiments, the additive manufacturing system used to form the exhaust port liners and the second additive manufacturing system used to form the cylinder head frame may be a single additive manufacturing system.

In the depicted embodiment, the cylinder head frame 1010 may define a plurality of inner mounting surfaces 1020 and a separate exhaust port liner 100 (two shown) may be disposed proximate the inner mounting surface for each exhaust port outlet. For example, the cylinder head frame may define eight inner mounting surfaces and the cylinder head may include eight exhaust port liners.

The cylinder head frame may include external cooling fins 1040 adapted for air cooling the cylinder head. The cylinder head may lack internal water coolant passages.

A cylinder head of an internal combustion engine may be fabricated as follows. A plurality of exhaust port liners may be fabricated from a metal such as a superalloy by use of an additive manufacturing system, as discussed above. Then, a cylinder head frame may be fabricated around the exhaust port liners to fabricate the cylinder head. The cylinder head frame may be cast by casting molten metal around the exhaust port liners. The molten metal may be, e.g., aluminum alloy. Alternatively, the cylinder head frame may be formed by a second additive manufacturing system, as discussed above.

The parameter chart below provides exemplary parameter values relevant to embodiments of the invention, with the low parameters indicating possible values that are lower than typical and the high parameters indicating possible values that are higher than typical. These are not to be construed as minimum or maximum values; values that are lower than the low values and higher than the high values fall within the scope of the invention.

Parameter Chart—Exhaust Port Liner

| Parameter | low | typical | high |
|---|---|---|---|
| Inner liner wall thickness | 0.5 mm | 1 mm | 4 mm |
| Outer liner wall thickness | 0.5 mm | 1 mm | 4 mm |
| Distance between inner surfaces of inner and outer walls | 1 mm | 1.5 mm | 10 mm |
| Partial vacuum in sealed cavity | 2 psi | 5 psi | 14.7 psi |
| Aperture diameter in sidewall for receiving a valve | 5 mm | 8 mm | 15 mm |

-continued

| Parameter | low | typical | high |
|---|---|---|---|
| Diameter of pillar | 0.5 mm | 1.5 mm | 4 mm |
| Height of pillar | 1 mm | 1.5 mm | 10 mm |
| Angle of outlet relative to inlet | 30° | 80° | 135° |
| Density | 3 g/cm$^3$ | 8.2 g/cm$^3$ | 13 g/cm$^3$ |
| Surface finish | Ra 1 μm | Ra 4 μm | Ra 7 μm |

Example

Figure 13:
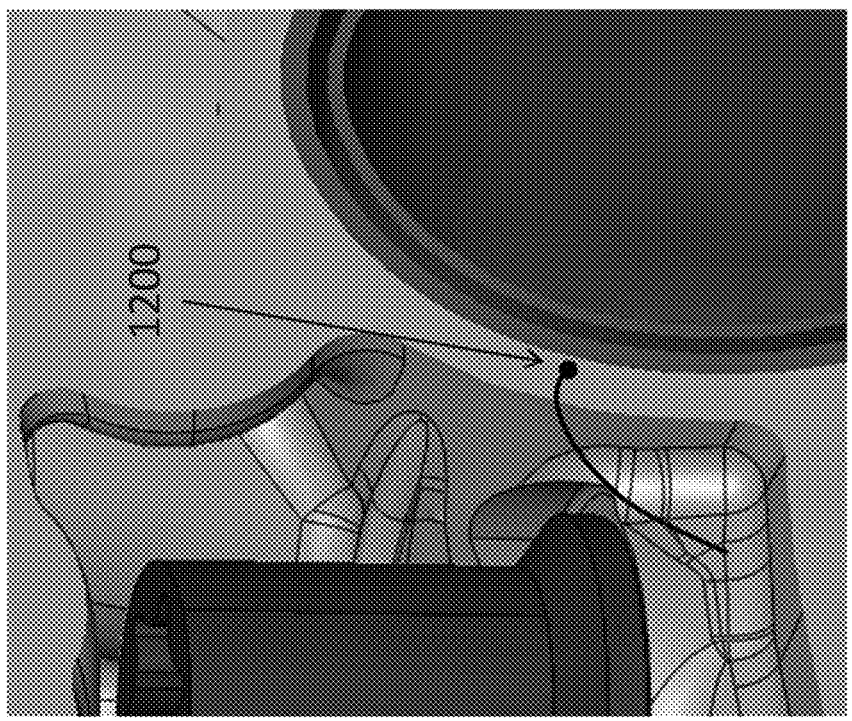
FIG. 13 is a cross-sectional view of a thermocouple disposed adjacent to an exhaust port liner, in accordance with an embodiment of the invention.
Figure 12:
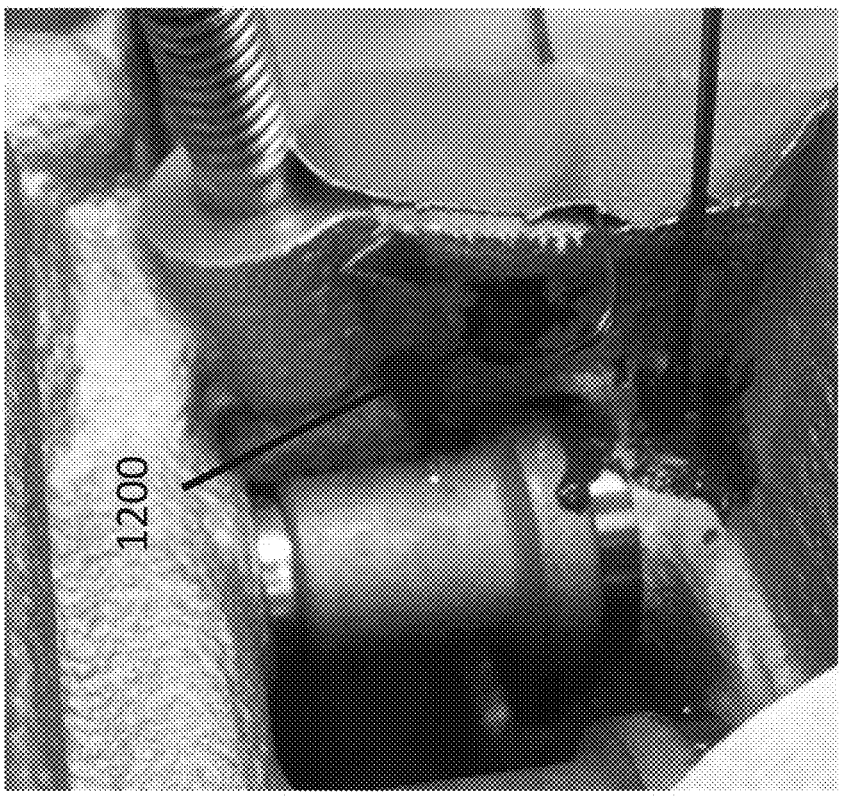
FIG. 12 is a photograph of a thermocouple fitted to a high performance, air cooled, gasoline engine, including a cylinder head in accordance with an embodiment of the invention.

Referring to FIG. 12, a cylinder head in accordance with an embodiment of the invention is pictured, incorporated in a high performance, air cooled gasoline engine. The liner was made by additive manufacturing, and the cylinder head frame was cast. The parameters of the liner are in accordance with the typical values indicated above. As also illustrated in FIG. 13, a measurement thermocouple is disposed adjacent to the exhaust port liner, which is made of Inconel®. In a test run, the exhaust gas temperature at rated conditions was approximately 850° C. The exhaust port liner provided insulation such that the peak measured temperature, with multiple ports as in FIG. 13, was only 184° C. This result demonstrates the efficacy of the port liner in providing thermal insulation. Moreover, no problems were encountered with the manufacture or durability of the exhaust port liner, or of its inclusion into the main cylinder head casting.

While the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. An exhaust port liner for a cylinder head of an internal combustion engine, the exhaust port liner comprising:
 a monolithic structure comprising:
  an inlet;
  an outlet disposed at an angle relative to the inlet; and
  a sidewall comprising a metal disposed between the inlet and the outlet defining an exhaust gas flow passage through the monolithic structure, the sidewall comprising an inner wall and an outer wall defining a cavity therebetween.

2. The exhaust port liner of claim 1, wherein the metal comprises a superalloy.

3. The exhaust port liner of claim 1, wherein the cavity comprises at least one of air or an inert gas.

4. The exhaust port liner of claim 1, wherein the cavity is sealed.

5. The exhaust port liner of claim 1, wherein the metal comprises a laser-sintered material.

6. The exhaust port liner of claim 1, wherein the sidewall defines at least one aperture extending therethrough.

7. The exhaust port liner of claim 1, wherein the monolithic structure comprises at least one filled opening forming a boundary of the cavity.

8. The exhaust port liner of claim 1, wherein the angle is in a range of 30° to 135°.

9. An exhaust port liner for a cylinder head of an internal combustion engine, the exhaust port liner comprising:
 a monolithic structure comprising:
  an inlet;
  an outlet disposed at an angle relative to the inlet;
  a sidewall comprising a metal disposed between the inlet and the outlet defining an exhaust gas flow passage through the monolithic structure, the sidewall comprising an inner wall and an outer wall defining a cavity therebetween; and
  a pillar disposed in the cavity and spanning from the inner wall to the outer wall.

10. The exhaust port liner of claim 1, further comprising:
 a second inlet adjacent to the inlet, wherein the inlet and the second inlet are in flow communication with the outlet.

11. A method for fabricating an exhaust port liner, the method comprising the steps of:
 receiving by an additive manufacturing system control instructions for fabricating the exhaust port liner comprising:
  a monolithic structure comprising:
   an inlet;
   an outlet disposed at an angle relative to the inlet; and
   a sidewall comprising a metal disposed between the inlet and the outlet defining an exhaust gas flow passage through the monolithic structure, the sidewall comprising an inner wall and an outer wall defining a cavity therebetween; and
 executing the control instructions by the additive manufacturing system to fabricate the exhaust port liner.

12. The method of claim 11, wherein the additive manufacturing system employs at least in part a process selected from the group consisting of vat polymerization, powder bed fusion, material extrusion, and direct energy deposition.

13. The method of claim 11, wherein the metal comprises a superalloy.

14. The method of claim 11, wherein the superalloy is selected from the group consisting of nickel-based superalloys and cobalt-based superalloys.

15. The method of claim 11, further comprising sealing the cavity.

16. A cylinder head of an internal combustion engine comprising:
 a cylinder head frame defining an inner mounting surface; and
 an exhaust port liner disposed proximate the frame inner mounting surface, the exhaust port liner comprising:
  a monolithic structure comprising:
   an inlet;
   an outlet disposed at an angle relative to the inlet; and
   a sidewall comprising a metal disposed between the inlet and the outlet defining an exhaust gas flow passage through the monolithic structure, the sidewall comprising an inner wall and an outer wall defining a sealed cavity therebetween,
 wherein an outer surface of the exhaust port liner conforms to the inner mounting surface.

17. The cylinder head of claim 16, wherein the metal comprises a superalloy.

18. The cylinder head of claim 16, wherein the sealed cavity comprises at least one of air or an inert gas.

19. The cylinder head of claim 16, wherein the metal comprises a laser-sintered material.

20. The cylinder head of claim 16, wherein the sidewall defines at least one aperture extending therethrough.

21. The cylinder head of claim 16, wherein the monolithic structure comprises at least one filled opening forming a boundary of the cavity.

22. A cylinder head of an internal combustion engine comprising:
- a cylinder head frame defining an inner mounting surface; and
- an exhaust port liner disposed proximate the frame inner mounting surface, the exhaust port liner comprising:
  - a monolithic structure comprising:
    - an inlet;
    - an outlet disposed at an angle relative to the inlet;
    - a sidewall comprising a metal disposed between the inlet and the outlet defining an exhaust gas flow passage through the monolithic structure, the sidewall comprising an inner wall and an outer wall defining a sealed cavity therebetween; and
    - a pillar disposed in the sealed cavity and spanning from the inner wall to the outer wall,
  - wherein an outer surface of the exhaust port liner conforms to the inner mounting surface.

23. The cylinder head of claim 16, wherein the cylinder head frame comprises a second metal.

24. The cylinder head of claim 16, wherein the exhaust port liner is fabricated by additive manufacturing and the cylinder head frame is fabricated by casting a second metal around the exhaust port liner.

25. The cylinder head of claim 16, wherein the exhaust port liner and the cylinder head frame are each fabricated by additive manufacturing.

26. The cylinder head of claim 16, wherein the cylinder head frame defines a plurality of inner mounting surfaces.

27. The cylinder head of claim 16, wherein the cylinder head frame further comprises external cooling fins adapted for air cooling the cylinder head.

28. The cylinder head of claim 16, further comprising an absence of internal water coolant passages.

29. A method for fabricating a cylinder head of an internal combustion engine, the method comprising the steps of:
- fabricating an exhaust port liner by:
  - receiving by an additive manufacturing system control instructions for fabricating the exhaust port liner comprising:
    - a monolithic structure comprising:
      - an inlet;
      - an outlet disposed at an angle relative to the inlet; and
      - a sidewall comprising a metal disposed between the inlet and the outlet defining an exhaust gas flow passage through the monolithic structure, the sidewall comprising an inner wall and an outer wall defining a cavity therebetween; and
  - executing the control instructions by the additive manufacturing system to fabricate the exhaust port liner; and
- fabricating a cylinder head frame around the exhaust port liner to fabricate the cylinder head.

30. The method of claim 29, wherein the additive manufacturing system employs at least in part a process selected from the group consisting of vat polymerization, powder bed fusion, material extrusion, and direct energy deposition.

31. The method of claim 29, wherein the metal comprises a superalloy.

32. The method of claim 29, wherein fabricating the cylinder head frame comprises casting molten metal.

33. The method of claim 29, wherein fabricating the cylinder head frame comprises a second additive manufacturing system receiving and executing control instructions to fabricate the cylinder head frame.

34. The method of claim 29, further comprising sealing the cavity prior to fabricating the cylinder head frame.

35. The exhaust port liner of claim 2, wherein the superalloy is selected from the group consisting of nickel-based superalloys and cobalt-based superalloys.

36. The exhaust port liner of claim 4, wherein the sealed cavity further comprises a partial vacuum.

37. The exhaust port liner of claim 6, wherein the aperture is aligned with an exhaust valve seat proximate the inlet when the exhaust port liner is installed in the cylinder head.

38. The exhaust port liner of claim 6, wherein the aperture is sized and oriented to receive a valve guide.

39. The exhaust port liner of claim 7, wherein the filled opening is filled with the metal.

40. The exhaust port liner of claim 9, further comprising a plurality of pillars in the cavity.

41. The exhaust port liner of claim 10, wherein (i) the sidewall defines a first aperture extending therethrough, sized and oriented to receive a valve guide, and (ii) the sidewall defines a second aperture extending, sized and oriented to receive a second valve guide, and (iii) the first aperture and the second aperture are aligned with respective exhaust valve seats proximate the inlet and second inlet when the exhaust port liner is installed in the cylinder head.

42. The method of claim 15, wherein sealing the cavity comprises filling an opening forming a boundary of the cavity.

43. The method of claim 42, wherein the opening is filled with the metal.

44. The method of claim 15, wherein sealing the cavity comprises welding with an electron beam.

45. The cylinder head of claim 17, wherein the superalloy is selected from the group consisting of nickel-based superalloys and cobalt-based superalloys.

46. The cylinder head of claim 20, wherein the aperture is aligned with an exhaust valve seat of the cylinder head frame.

47. The cylinder head of claim 20, wherein the sidewall aperture is sized and oriented to receive a valve guide.

48. The cylinder head of claim 16, wherein the cylinder head frame defines a single mounting surface with a single exhaust port liner disposed proximate thereto, and the sidewall defines a plurality of apertures, each sized and oriented to receive a valve guide.

49. The cylinder head of claim 21, wherein the filled opening is filled with the metal.

50. The cylinder head of claim 16, wherein the angle is in a range of 30° to 135°.

51. The cylinder head of claim 22, further comprising a plurality of pillars in the cavity.

52. The cylinder head of claim 23, wherein the second metal comprises an aluminum alloy.

53. The cylinder head of claim 26, further comprising a plurality of the exhaust port liners, wherein one of the plurality of exhaust port liners is disposed proximate one of the inner mounting surfaces.

54. The cylinder head of claim 26, wherein the cylinder head frame defines a plurality of inner mounting surfaces and the cylinder head comprises a corresponding number of exhaust port liners.

55. The method of claim 31, wherein the superalloy is selected from the group consisting of nickel-based superalloys and cobalt-based superalloys.

56. The method of claim 32, wherein the molten metal comprises an aluminum alloy.

57. The method of claim 33, wherein the second additive manufacturing system employs at least in part a process selected from the group consisting of vat polymerization, powder bed fusion, material extrusion, and direct energy deposition.

58. The method of claim 33, wherein the additive manufacturing system and the second additive manufacturing system are a single additive manufacturing system.

59. The method of claim 34, wherein sealing the cavity comprises filling an opening forming a boundary of the cavity.

60. The method of claim 59, wherein the opening is filled with the metal.

61. The method of claim 34, wherein sealing the cavity comprises welding with an electron beam.

62. The exhaust port liner of claim 1, wherein the cavity comprises a partial vacuum.

63. The cylinder head of claim 16, wherein the sealed cavity comprises a partial vacuum.

* * * * *